United States Patent [19]

Basteck

[11] Patent Number: 5,782,587
[45] Date of Patent: Jul. 21, 1998

[54] DRILLING TOOL

[75] Inventor: Andreas Basteck, Freiburg, Germany

[73] Assignee: August Beck GmbH & Co., Winterlingen, Germany

[21] Appl. No.: 667,547

[22] Filed: Jun. 21, 1996

[30] Foreign Application Priority Data

Jun. 23, 1995 [DE] Germany ............ 195 22 836.7

[51] Int. Cl.[6] ................ B23B 51/06; B23B 51/00
[52] U.S. Cl. ................ 408/59; 408/83; 408/229; 408/230
[58] Field of Search ................ 408/83, 143, 227, 408/229, 230, 705, 713, 57, 59, 199, 223–225; 175/394

[56] References Cited

U.S. PATENT DOCUMENTS

| | | | |
|---|---|---|---|
| 1,104,989 | 7/1914 | Hanson | 408/59 |
| 4,340,327 | 7/1982 | Martins | 408/225 |
| 4,966,503 | 10/1990 | Davidson | 408/83 |
| 5,354,156 | 10/1994 | Von Haas et al. | 408/223 |

FOREIGN PATENT DOCUMENTS

| | | | |
|---|---|---|---|
| 3-142118 | 6/1991 | Japan | 408/230 |
| 249898 | 12/1969 | U.S.S.R. | 408/229 |
| 677826 | 8/1976 | U.S.S.R. | 408/57 |
| 562389 | 9/1977 | U.S.S.R. | 408/229 |

Primary Examiner—Steven C. Bishop

[57] ABSTRACT

The invention relates to a drilling tool (11) for bores in solid material, comprising a drill shank (26) which has a radially inner indexable insert (13) at an inner chip space (21) and a radially outer indexable insert (14) at an outer chip space (22), the working areas of which indexable inserts (13, 14) overlap, the inner chip space (21) having a cover (36) which extends at least partly along the shank longitudinal axis (20), and the inner chip space (21) merging into the outer chip space (22), so that the chip discharge is effected via a common chip space (23) in the rear area (32) of the drilling tool (11).

18 Claims, 4 Drawing Sheets

DRILLING TOOL

BACKGROUND OF THE INVENTION

1. Field of the Invention

The invention relates to a drilling tool for bores in solid metal material.

2. Discussion of Prior Art

EP 0 054 913 A2 discloses a drilling tool for bores in solid metal material which has a drill shank with at least two receptacles which are offset at equal circumferential angular distances and in which in each case at least one interchangeable indexable insert having a plurality of cutting edges of the same length is arranged in the radial direction. A recess for the chip discharge is provided for each of these indexable inserts, which recess extends axially into a rear area of the drill shank. The respective angle bisector of the engaged cutting edges encloses an acute angle with a line parallel to the drill axis. Radial cutting compensation can thereby be provided, so that the drill is selfcentring and removes material along the drill axis.

However, drills of this type have the disadvantage that they have low rigidity over the entire drill shank on account of their cross-sectional profile, the result of which is that the drilling tool is set in vibration during the cutting operation, as a result of which chatter marks may develop at the bottom of the bore. Furthermore, a reduction in the cutting capacity and service life is associated therewith. Although the radial cutting force is compensated for on account of the indexable-insert arrangement, withdrawal scores which affect the quality of the bore are consequently caused when the drilling tool is pulled out.

SUMMARY OF THE INVENTION

The object of the invention is to develop further a drilling tool as defined in the preamble to the effect that the rigidity of the drill shank is increased and a vibration-damped drilling operation is made possible.

This object is achieved by a drilling tool having a drill shank which has at least one axially extending recess and at least two indexable inserts that are arranged at a different radial distance from the longitudinal drill axis on the endface of the drill shank. The indexable inserts are at least similar geometrically and have working areas that overlap. Each of the inserts has two cutting edges that are of the same length, are inclined adjacent to one another, are at an obtuse angle to one another, and are in cutting engagement simultaneously. The radially inner indexable insert slightly overlaps the drill axis with its one engaged cutting edge. The radially outer indexable insert forms the drill diameter with its one engaged cutting edge. At least one of the angle bisectors of the cutting edges of an indexable insert is inclined at an angle (a) relative to the drill longitudinal axis. At least one cover extends axially at least partly from the end face of the drilling tool and is allocated to at least one recess. The design of a cover for a chip space in the front area of the drill shank permits higher rigidity of the crosssection of the drill shank. During the cutting operation, the two cutting edges, arranged essentially opposite one another, of the indexable inserts can thereby be kept essentially in their position determined by the crosssection of the drill shank. Excitation of vibrations can thereby be reduced to a minimum. This has the advantage that the cutting force or the cutting engagement can be kept constant essentially during the entire drilling operation, as a result of which the resulting force acting on the cutting edges is likewise of essentially constant magnitude. This vibration-damped drilling operation enables the feed force to be increased and therefore enables the drilling time to be reduced. the bottom of the bore as well as the bore wall at the same time having a high quality grade and the bottom of the bore in particular being free of chatter marks.

An advantageous embodiment of the invention is that an inner chip space allocated to the radially inner indexable insert merges into an outer chip space allocated to the radially outer indexable insert. In this arrangement, the outer chip space extends advantageously along the drill longitudinal axis, the inner chip space advantageously having a helix so that the inner chip space, offset from the outer chip space by essentially 180° in the front area, can merge into the outer chip space. A cross-sectional enlargement can thereby be achieved in turn in the rear area of the drill shank, which cross-sectional enlargement permits a substantial increase in the rigidity of the drilling tool.

A further advantageous embodiment of the invention provides for the transition area from the inner chip space into the outer chip space to be provided in the central to rear area of the drill shank, so that a rear area of the drill shank can be provided with a ¾ cross-section which is designed to be large in relation to the cross-section in the front area of the drill shank. The common chip space following the transition area essentially corresponds to the size of the outer chip space and advantageously runs constantly in its size over the remaining length of the drill shank.

A further advantageous embodiment of the drilling tool provides for the transition area between the inner chip space and the outer chip space to be of large design, so that the chips which are to be discharged and strike one another in this area can continue to be discharged effectively without a chip blockage occurring or a ball being formed. The forces occurring in the process and acting on the drill shank, which forces could occur due to the chips of the inner and outer chip spaces striking one another, are received without difficulty by the drill shank, which already has high rigidity in this area on account of the ¾ cross-section or only a common chip space.

In a further advantageous refinement of the invention, provision is made for the angle bisectors of the cutting edges, having the same length, of the radially inner and outer indexable inserts to be inclined together by a small angle relative to the longitudinal axis of the drill shank. By this rotation, in particlar in the arrangement of the indexable inserts which are arranged offset from one another by about 172° as viewed radially to the longitudinal axis of the drill shank, an engagement of the indexable inserts may intentionally be selected in which the resulting radial-force components are different from zero. Drill holes may thereby be cut whose diameter is slightly greater than the drill diameter. Consequently, no withdrawal scores can occur any longer when the drilling tool is pulled out of the drill hole.

Further advantageous refinements and developments of the drilling tool according to the invention are specified in the further sub-claims and the description.

BRIEF DESCRIPTION OF THE DRAWINGS

A preferred exemplary embodiment is shown in the drawings, in which.

BRIEF DESCRIPTION OF A PREFERRED EMBODIMENT

Figure 1:
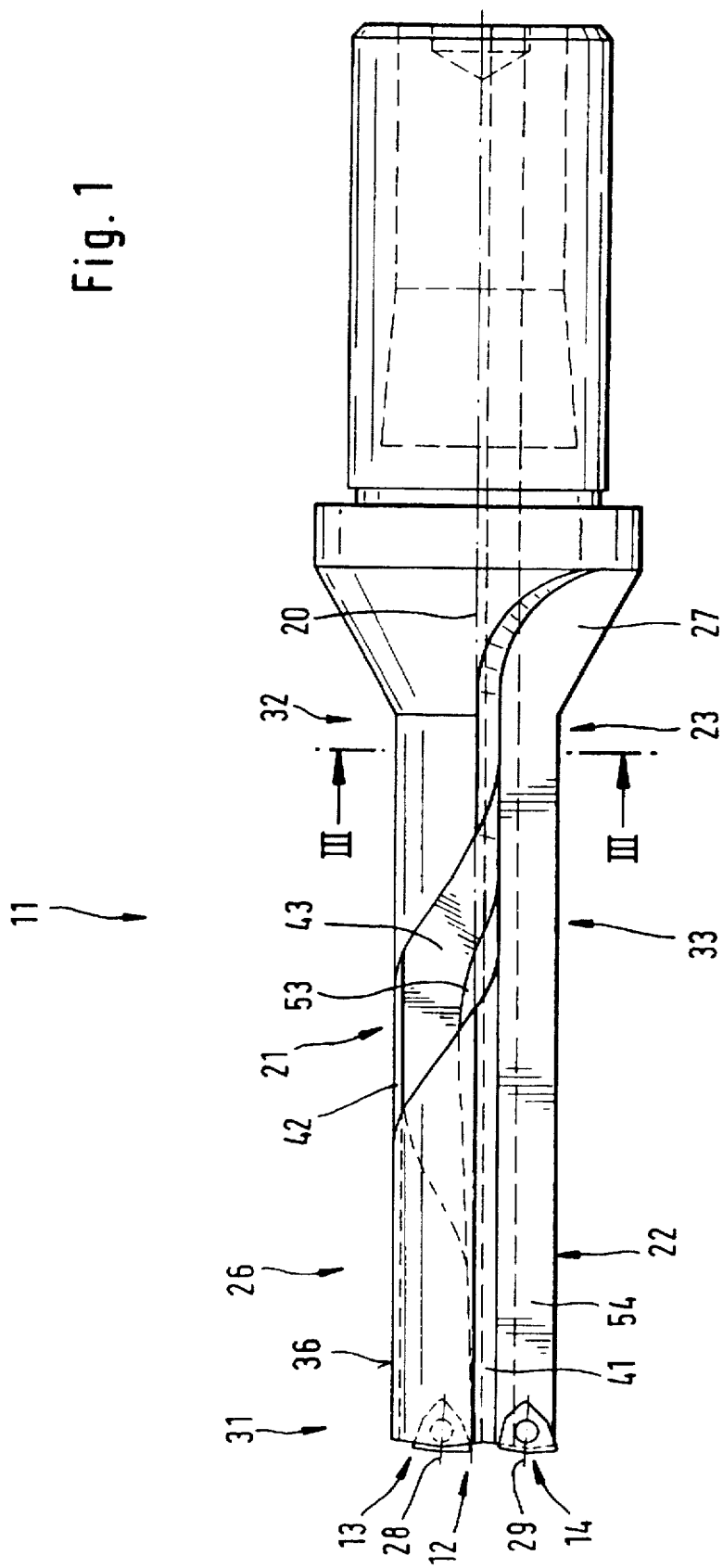
FIG. 1 shows a side view of the drilling tool according to the invention.

FIG. 1 shows a drilling tool 11 according to the invention, on the end face 12 of which two indexable inserts 13, 14 are arranged which are offset from one another at an angle of 172°. The hexagonal indexable inserts 13, 14 have two cutting edges 16, 17; 18, 19 which are essentially of the same length and are arranged at a roof angle to one another. A radially outer indexable insert 14 determines the drilling diameter. A radially inner indexable insert 13 is arranged in such a way that its radially inner cutting edge 16 projects slightly beyond a drill axis or shank longitudinal axis 20. The indexable inserts 13, 14 have an overlapping working area.

A recess 22 for the chip discharge is allocated to the outer indexable insert 14, which recess 22 is designated below as outer chip space. The outer chip space 22 extends along the shank longitudinal axis 20 over the entire drill shank 26 and merges into a runout portion 27.

A recess 21 is likewise allocated to the inner indexable insert 13, which recess 21 is designated below as inner chip space. The inner chip space 21 has a boundary wall 53 accommodating the indexable insert 13 and a side surface 43 arranged essentially at right angles to the boundary wall 53. The inner chip space 21 has a thread-like helix as viewed in its course from a front area 31 into the rear area 32 of the drill shank 26. The inner chip space 21 merges into the outer chip space 22 in a transition area 33, as a result of which the chip discharge in the rear area 32 of the drill shank 26 is effected via a common chip space 23. The common chip space 23 is advantageously the continuation of the outer chip space 22. Alternatively, provision may be made for both the inner chip space 21 and the outer chip space 22 to have an angle of twist and for them to merge into a common chip space 23, which may also be designed to be larger in cross-section. The common chip space 23 may be passed over to the chip runout portion 27 both rectilinearly to the drill longitudinal axis 20 and at an angle of twist.

The inner chip space 21 has a cover 36 which extends at least partly over the length of the inner chip space 21 as viewed in the axial longitudinal direction. The cover 36 advantageously extends right into the transition area 33, so that the chip arising at the inner indexable insert 13 is carried within a chip space 21 of passage-like design. A closed system has been created on account of the cover 36 arranged for the inner chip space 21. The inner chip space has a right-hand twist with an angle in the range of 20° to 40° so that there is a conveying action for the chip discharge in the closed system.

Furthermore, the cover 36 has the advantage that the chips flowing off are not pressed against the bore wall but can be discharged in this passage, as a result of which further reaction forces on the drill shank 26 are avoided and the drilling tool 11 can therefore run considerably more smoothly. This cover 36 advantageously constitutes a measure which is provided to dampen vibrations or to avoid vibrations and their excitation.

Figure 2:
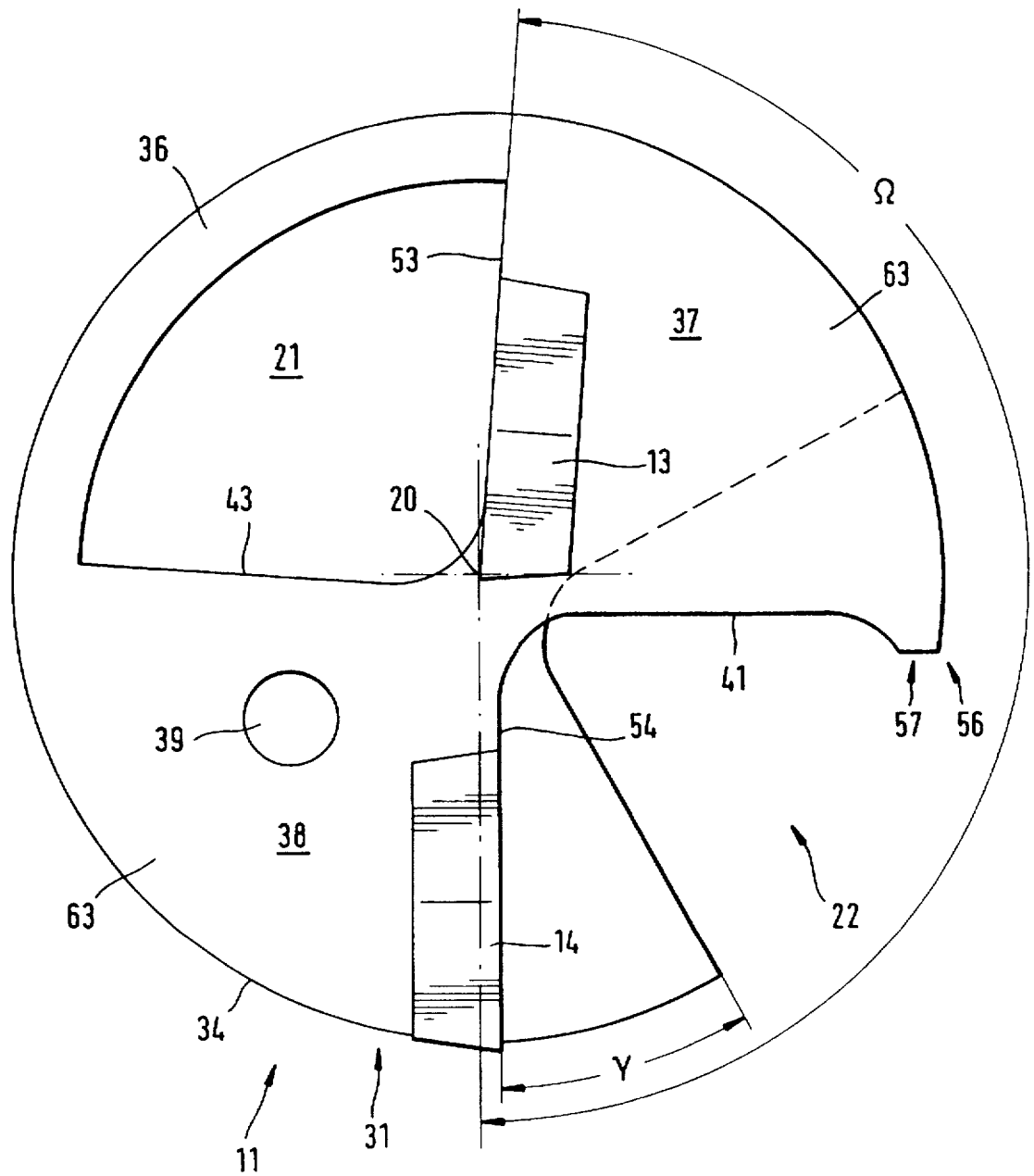
FIG. 2 shows an end view of the drilling tool according to FIG. 1.

FIG. 2 shows an end view of the drilling tool 11 according to the invention. The cover 36 arranged at the inner chip space 21 merges smoothly into the circumferential surface 34 of the drill shank 26. In the 5×D drilling tool according to the invention, the wall thickness of the cover 36 ranges between 0.5 mm and 4 mm, in which case the wall thickness does not drop below 1 mm in the thinnest area. On account of the cover 36, substantial stiffening of the basic body of the drill in the front area can be achieved, which stiffening covers an angle Ω of 172° in the drilling tool according to the invention. The section modulus of the two quadrant cross-sections 37, 38 is thereby substantially increased. A deviation from the arrangement of the cutting edges arranged at a certain angle to one another can thus be prevented to the greatest possible extent, which can in turn result in a reduction in vibrations and at the same time an increase in the cutting forces. This is due to the fact that the moment of inertia, small per se, in the inner chip space 21 is increased.

Furthermore, the angular arrangement of 172° has the advantage that the inner chip space 21 is opened or enlarged, which benefits the chip flow at the inner indexable insert and dampens vibrations.

To cool the drilling tool 11 during cutting, a cooling-liquid bore 39 is provided in a quadrant cross-section 63 accommodating the radially outer indexable insert 14. A cooling-liquid bore 39 in a quadrant cross-section accommodating the radially inner indexable insert 13 is not made possible, mainly on account of the helix of the inner chip space 21, which merges into the outer chip space 22.

The inner chip space 21 advantageously merges into the outer chip space 22 in the central to rear area, so that the rear area 32 of the drill shank 26 can be approximately one third ± 20% of the overall length of the drill shank 26. The drill stability can be increased on account of the increase in the rigidity in at least the rear area 32 of the drill shank 26, which in turn permits a reduction in the excitation of vibrations, so that the quality of the drilling tool 11 is further increased.

The cover 36 may cover the inner chip space 21 to such an extent that the transition area 33 lies solely in the plane of a side surface 41 of the outer chip space 22, which side surface 41 is arranged opposite a boundary wall 54 accommodating the radially outer indexable insert 14.

Alternatively, provision may likewise be made for the end face 42 of the cover 36, which in the preferred exemplary embodiment lies in the side surface 41, to be set back from this side surface 41, so that the inner chip space 21 is only partly covered.

Furthermore, provision may be made for the end face 42 to extend radially relative to the axially extending side surface 41 described above, so that the inner chip space 21 is likewise only partly covered and a larger transition area 33 may be created.

Figure 3:
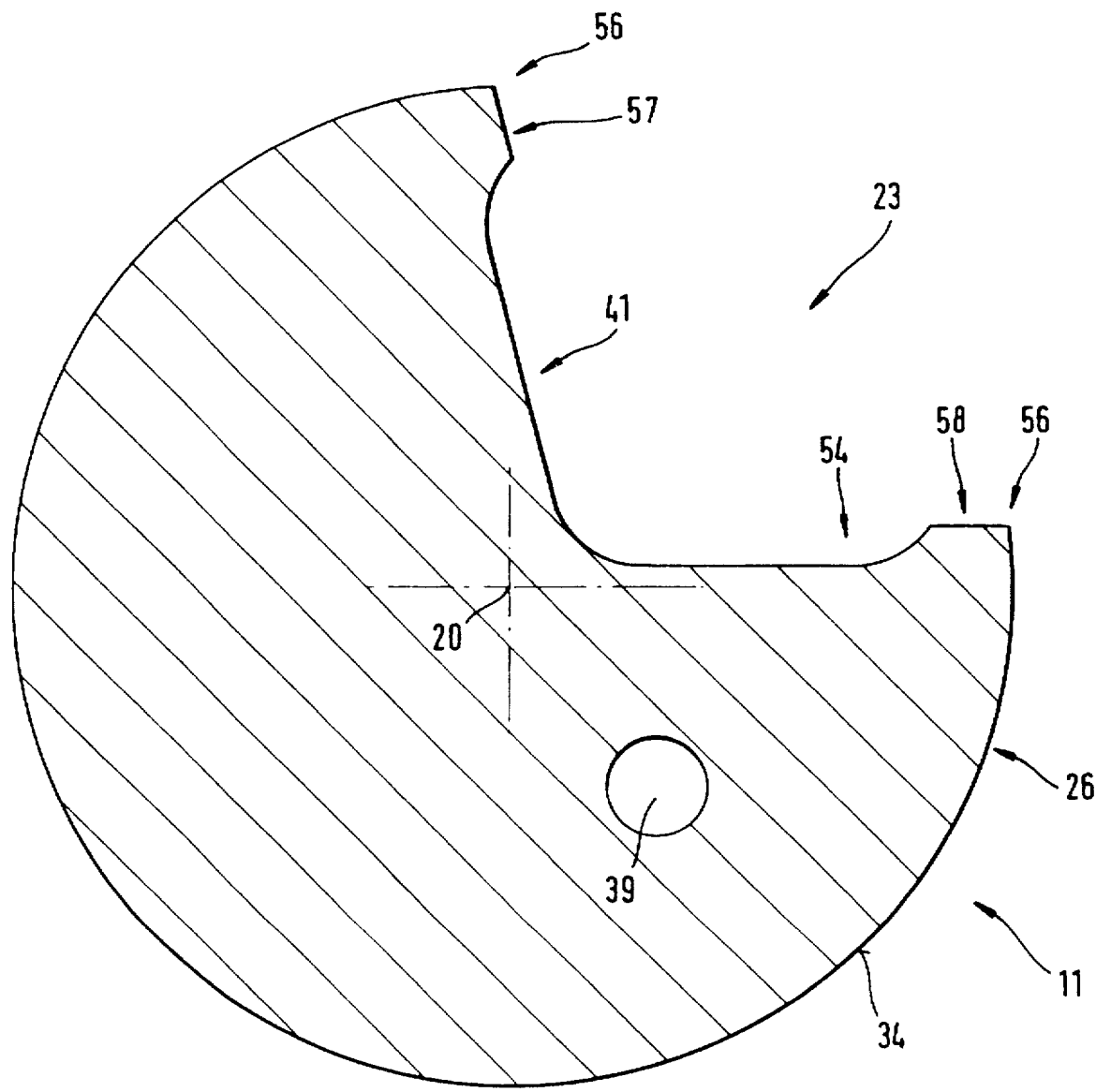
FIG. 3 shows a schematic cross-section of the drilling tool along line III—III in FIG. 1.

FIG. 3 shows a schematic cross-section of the drilling tool 11 along line III—III in FIG. 1. In this area, the cross-section is designed as an approximately three-quarter solid cross-section of the drill shank 26. The common chip space 23 directly follows the outer chip space 22 and has essentially the same chip-flow volume. A side surface 41 and a boundary wall 54, in which the indexable insert 14 is arranged in the front area 31 of the drill shank 26, forms the common outer chip space 23. This side surface 41 and boundary wall 54 are arranged approximately at right angles to one another and form a chip space which, according to FIG. 3, essentially corresponds to the first quadrant of the XY-axis coordinate system. A stiffening bead 57, 58 is provided in each case on the outer marginal zones 56 of the side surface 41 and boundary wall 54. The stiffening bead 57 which is allocated to the side surface 41 extends over the entire length of the drill shank 26 and thereby permits an increase in the section modulus as well as in the moment of inertia. The stiffening bead 57 is designed to be continuous along the drill shank 26 provided an end face 42 of the cover 36 lies in the side surface 41. If this is not the case, the stiffening bead 57 can reach into the transition area 33.

The stiffening bead 58 which is provided on the boundary wall 54 may advantageously extend right into the front area 31 of the indexable insert 14. Provision may likewise be made for this stiffening bead 58 to end in the transition area 33. The stiffening bead 57, 58 is designed in a strip shape and has a slight elevation relative to the side surfaces 41, 54. A smooth transition is created in the transition area from the side surface 41 and boundary wall 54 to the stiffening beads 57, 58. The outer marginal area 56 of the stiffening bead 57, 58 directly adjoins a circumferential surface 34 of the drill shank 26 and can thereby form a further guide surface. The elevation of the stiffening bead 57, 58 relative to the side surface 41, 54 may be in the range of a few millimetres. The width of the stiffening bead 57, 58 is designed to be small relative to the side surface 41, 54, so that the size of the chip space 23 is essentially retained in its entirety. In addition, the moment of inertia and the section modulus are thereby substantially increased.

Figure 5:
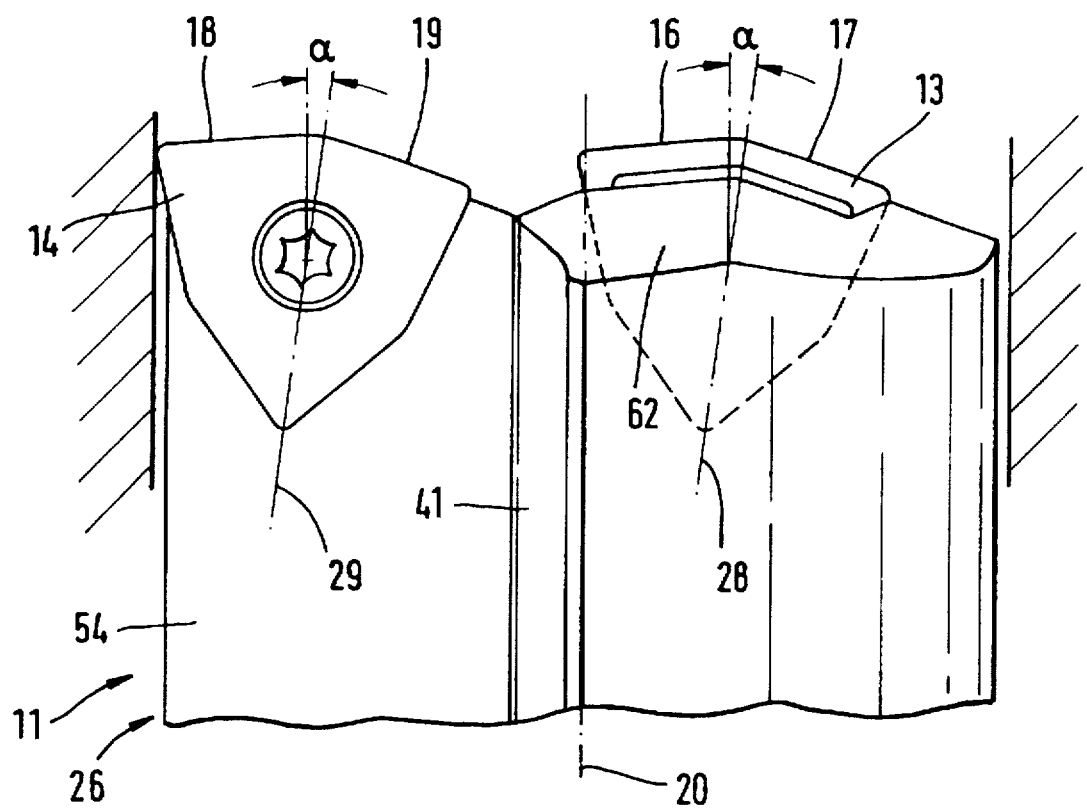
FIG. 5 shows a schematic representation of the drilling tool according to the invention with symmetrical rotation of the indexable inserts.
Figure 4:
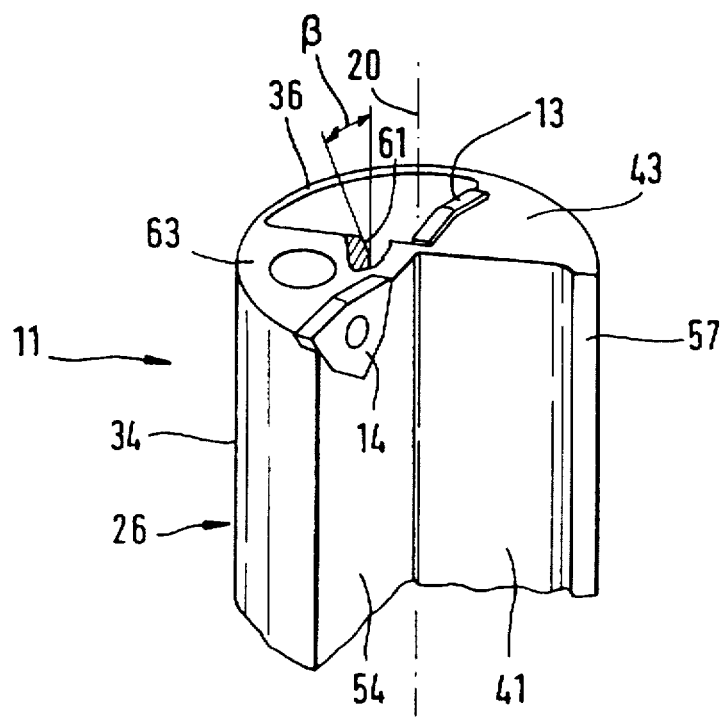
FIG. 4 shows a perspective view of a front area of the drilling tool according to the invention.

FIG. 5 shows a front area 31 of the drilling tool 11 according to the invention. The indexable inserts 13, 14 are fastened with a clamping bolt in a shiftable and interchangeable manner. The indexable inserts 13, 14 are in cutting engagement in each case with two cutting edges 16, 17; 18, 19, the indexable insert 13 cutting an area adjoining the drill longitudinal axis 20 and overlapping the latter to a small extent, and the indexable insert 14 cutting the bore area which reaches up to the drill circumference. The individual working areas of the indexable inserts 13, 14 overlap. With regard to their cutting edges 16, 17 and 18, 19 respectively, the indexable inserts 13, 14 each have an angle bisector 28, 29, which angle bisectors are rotated together relative to a shank longitudinal axis 20 in a range between 0° and 10°, preferably by 4°, relative to the drill longitudinal axis 20. In connection with the indexable-insert arrangement at an angle Ω in the range of 165° to 185°, preferably 172°, this enables the sum of the radial-force components resulting from all effective cutting edges 16, 17; 18, 19 in engagement to be different from zero. This enables the drill 11 to work with a slightly larger diameter during the drilling operation. This results in the advantage that the drilling tool cannot jam in the bore and no withdrawal scores can occur in the bore wall when the drill shank is pulled out.

The method according to the invention for producing a 5×D drilling tool 11 with a cover will now be described below. It goes without saying that this method is not restricted just to this drilling tool.

The basic material for producing a drilling tool 11 is a round bar which is made of material which is known and suitable for the drilling tool 11. This round bar is centred and an outer chip groove 22 extending axially over the drill shank 26 is subsequently milled, which outer chip groove 22 forms the outer chip space and ends in the runout portion 27.

The inner chip space 21 is milled after the outer chip space 22 is made, in which case the inner chip space 21, first of all arranged offset from the outer chip space 22 essentially by 180° in the front area 31, is milled with an essentially constant helix, so that it merges into the outer chip space 22 in a transition area, advantageously in the central area of the drill shank 26, and a good conveying action can be achieved for the chip discharge. Here, provision may advantageously be made for the inner chip space 21 first of all to run rectilinearly, as viewed from the end face 12 of the drilling tool 11, before this inner chip space 21 merges into an inclined surface on account of the helix.

A diametral area is turned in the front area 31 of the drill shank 26, onto which diametral area a sleeve is put which serves to form the cover 36. As a function of the degree of covering or of the design of the transition area 33, the turned diametral area extends along the longitudinal axis 20 towards the rear area 32 of the drill shank 26. The sleeve is put onto the turned diametral area in a positively locking and/or frictionally locking manner. This may be done by known methods such as welding-on, shrink fitting, soldering or the like.

For the further operation, the round bar is then set up eccentrically relative to the previous operation, so that the round bar is mounted eccentrically to its longitudinal axis of the first operation of the machine tool. The outside diameter of the round bar mounted eccentrically in a lathe is then turned completely so that a common circumferential surface 34 of the drilling tool 11 is formed which extends over the entire length of the drill shank 26. The chip space 22 is thus exposed (by piercing the sleeve), in which case the chip space 21 continues to be covered by the sleeve.

Thus a drill which has high rigidity and exhibits low excitation of vibrations and in addition is inexpensive to produce can be created by a small number of production steps.

I claim:

1. A drilling tool for boring solid metal material, comprising:

a drill shank (26) having a longitudinal axis (20) and an end face (12), at least one axially extending recess (21, 22) and at least two indexable inserts (13, 14), in which said indexable inserts are arranged at different radial distances from said longitudinal axis (20), are at least similar geometrically, have working areas that overlap, and have two cutting edges (16, 17, 18, 19) that are of the same length, are inclined adjacent to one another, are arranged at an obtuse angle to one another, and are in cutting engagement simultaneously, a radially inner indexable insert (13) slightly overlapping said drill axis (20) with one engaged cutting edge (16), a radially outer indexable insert (14) forming a drill diameter with an engaged cutting edge (18), and at least one angle bisector (28, 29) of said cutting edges (16, 17, 18, 19) being inclined at an angle (α) relative to said longitudinal axis (20), and in which at least one cover (36) extends axially from said end face (12) of said drilling tool, is arranged in at least one of said recesses (21, 22), and forms an integral portion of said drill shank (26).

2. A drilling tool according to claim 1, in which said cover (36) covers a recess (21) associated with said radially inner indexable insert (13).

3. A drilling tool according to claim 2, in which a recess (22) associated with said radially outer indexable insert (14) and said recess (21) associated radially inner indexable insert (13) merge into a common recess (23).

4. A drilling tool according to claim 3, in which said common recess (23) is a continuation of said recess (22) associated with said radially outer indexable insert (14).

5. A drilling tool according to claim 1, in which said cover (36) extends axially along said drill shank (26) at least over a quarter length of said drill shank (26).

6. A drilling tool according to claim 1, in which said recess (21) associated with said radially inner indexable insert (13) comprises a helix leading into a recess (22) that extends essentially axially along said drill shank (26).

7. A drilling tool according to claim 1, in which said cover (36) has a wall thickness of approximately 0.5 to 4.0 mm.

8. A drilling tool according to claim 1, in which said cover (36) extends into a side surface (41) of a recess (22) associated with said radially outer indexable insert (14).

9. A drilling tool according to claim 1, in which said recess (22) associated with said radially outer indexable insert (14) at least on a side surface (41) opposite said radially outer indexable insert (14) has a stiffening bead (57) that adjoins a circumferential surface (34) of said drill shank (26) and extends axially over an entire length of said recess (22) associated with said radially outer indexable insert (14).

10. A drilling tool according to claim 9, in which said stiffening bead (57) extends over an entire length of said drill shank (26).

11. A drilling tool according to claim 9, in which said stiffening bead (57) is narrow in relation to a width of said side surface (41).

12. A drilling tool according to claim 9, in which said stiffening bead (57) is arranged to increase at least one of a moment of inertia or a section modulus of said drill shank (26).

13. A drilling tool according to claim 9, in which said stiffening bead (57) has an outer marginal zone that forms part of a circumferential surface (34) of said drill shank (26) and is a guide surface.

14. A drilling tool according to claim 8, in which said stiffening bead (57) projects less than 3 mm. from said side surface (41).

15. A drilling tool according to claim 9, in which said stiffening bead (57) extends to a transition area (33) in which said axially extending recesses (21, 22) merge.

16. A drilling tool according to claim 1, in which said recesses (21, 22) are diametrically opposite each other and have boundary surfaces (53, 54) arranged essentially at right angles to side surfaces (41, 43), respectively, at least partly along said longitudinal axis (20).

17. A drilling tool according to claim 16, further comprising a quadrant segment section (63) accommodating said radially outer indexable insert (14) in a front area of said drill shank, said quadrant segment section (63) having a cooling liquid bore (39).

18. A drilling tool according to claim 16, in which said boundary surfaces (53, 54) and said side surfaces (41, 43) are small.

* * * * *